United States Patent [19]

Furuta

[11] 4,377,826
[45] Mar. 22, 1983

[54] METHOD FOR DETECTING A SPECIFIC RECORDING POSITION ON A RECORDING MEDIUM AND AN APPARATUS USING THIS METHOD

[75] Inventor: Kenji Furuta, Hachioji, Japan

[73] Assignee: Olympus Optical Co., Ltd., Tokyo, Japan

[21] Appl. No.: 187,764

[22] Filed: Sep. 16, 1980

[30] Foreign Application Priority Data

Sep. 26, 1979 [JP] Japan .................................. 54-123690

[51] Int. Cl.³ .......................................... G11B 15/18
[52] U.S. Cl. ................................. 360/72.1; 360/74.4
[58] Field of Search .......................... 360/72.1–72.3, 360/74.2, 74.5, 71, 73, 69

[56] References Cited

U.S. PATENT DOCUMENTS 4,067,044  1/1978  Maeda et al. ...................... 360/72.1

FOREIGN PATENT DOCUMENTS 26-1776  4/1951  Japan .
50-28082  7/1975  Japan .

Primary Examiner—John H. Wolff
Attorney, Agent, or Firm—Frishauf, Holtz, Goodman and Woodward

[57] ABSTRACT

A method and apparatus for detecting a specific recording position on a recording medium, wherein a detected cue signal is reproduced at a spontaneous travel speed of the recording medium, the detected cue signal having a frequency corresponding to the frequency of a given cue signal which was recorded at a predetermined recording travel speed of the recording medium at a specific position of the recording medium; and the specific position is determined by counting the frequency of the detected cue signal, taking as a reference a repetitive reel signal having a period which is a function of the rotational frequency of the reel on which the recording medium is wound.

8 Claims, 3 Drawing Figures

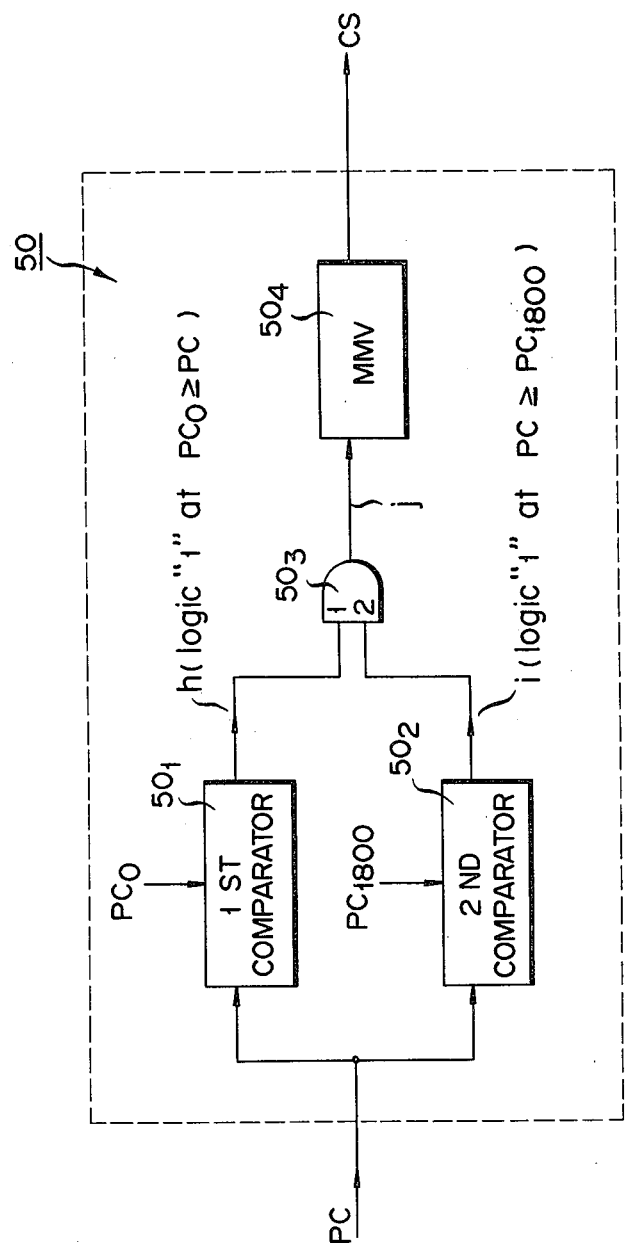
F I G. 3

METHOD FOR DETECTING A SPECIFIC RECORDING POSITION ON A RECORDING MEDIUM AND AN APPARATUS USING THIS METHOD

BACKGROUND OF THE INVENTION

The present invention relates to a method for detecting a specific recording position using cue signals for checking or cuing the recorded information, and an apparatus using this method.

In a tape recorder for recording dictation, a position-indicating signal or a cue signal is often used for searching and checking for a desired position of the recorded information. A plurality of cue singals are used for checking and discriminating between a plurality of recorded information positions. For example, for recording the proceedings of a conference, a first cue signal may be used to indicate a speech by person A and a second cue signal may be used to indicate a speech by person B.

Since checking of recordings using cue signals must be done under the high speed reproducing condition, the tape is often driven by the reel drive. The tape travel speed furnished by the reel drive changes as the diameter of the tape coil wound on the drive reel changes. Thus, the frequency of the cue signal (number of pulses per unit time) changes as the tape coil diameter changes. When a plurality of different kinds of cue signals containing mutually different frequency components are used so that these cue signals may be discriminated from each other by utilizing the frequency difference, the frequency ranges of these cue signals tend to overlap each other during such high speed reproduction so that these cue signals might not be properly discriminated.

SUMMARY OF THE INVENTION

The object of the present invention is to provide a method for detecting a specific recording position in a recording medium and an apparatus using this method, wherein a plurality of cue signals can be discriminated regardless of the tape speed while reproducing the cue signals.

To the above and other ends, the present invention provides a method for detecting a specific recording position in a recording medium, wherein the reproduced cue signals are counted according to the rotating frequency of the reels so that a desired cue signal can be detected regardless of the tape travel speed.

BRIEF DESCRIPTION OF THE DRAWINGS

FIG. 3 is a diagram illustrating the construction of the coincidence sensors shown in FIG. 2.

DETAILED DESCRIPTION OF THE PREFERRED EMBODIMENT

Figure 1:
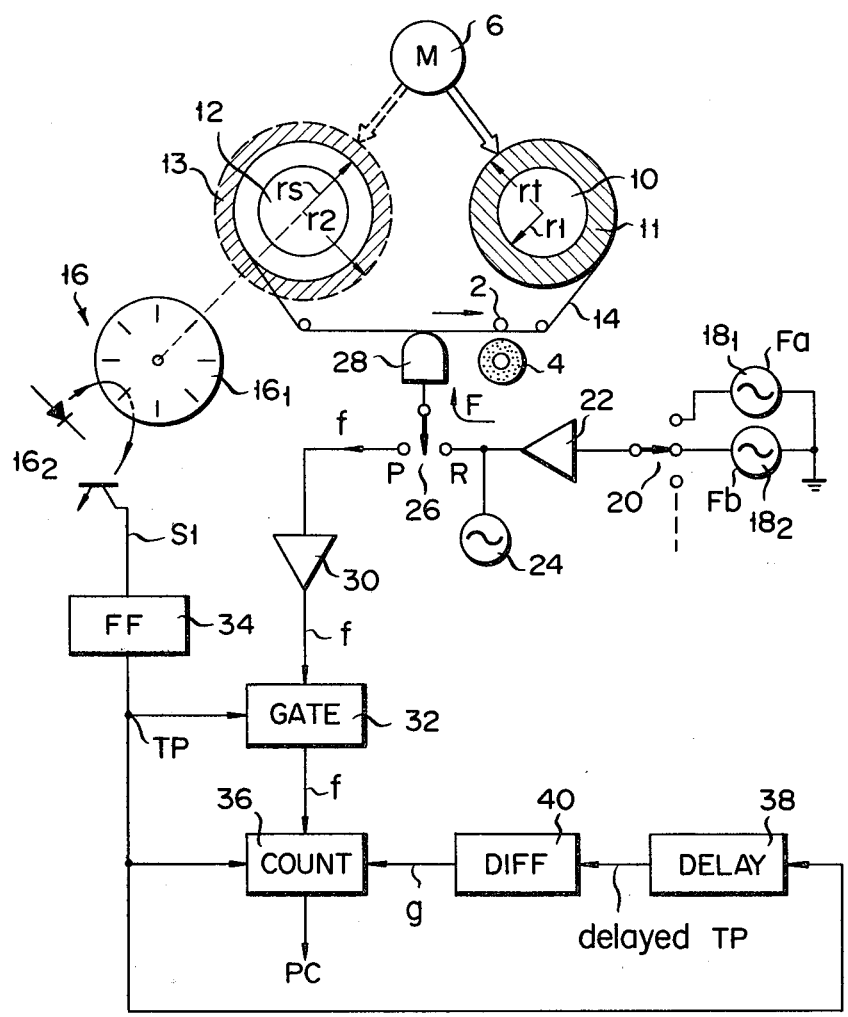
FIG. 1 is a diagram illustrating an embodiment of an apparatus using a method in accordance with the present invention for detecting a specific recording position in a recording medium.

FIG. 1 shows a diagram of the main part of the apparatus using the method according to the present invention for detecting a specific recording position in a recording medium. A take-up reel 10 and a supply reel 12 have the same radius $r_1$. The radii of coils of magnetic tape (recording medium) 14 wound on the reels 10 and 12 are designated by $r_t$ and $r_s$, respectively. The tape coil radius when the tape 14 is completely wound on either reel is designated by $r_2$. That is, $r_1$ denotes the minimum radius and $r_2$ denotes the maximum radius.

A predetermined tape travel speed supplied by a capstan drive utilizing a capstan 2 and a pinch roller 4 is represented by V (cm/sec); the mean thickness of the tape 14 is denoted by d (cm); and the time during which the tape travelled is denoted by t (sec). Then the side area (cross-hatched part 11) of the tape 14 wound on the reel 10, for example, may be represented by the following equation:

$$\pi r_t^2 - \pi r_1^2 = dVt \tag{1}$$

from this, $r_t$ may be obtained by the following equation:

$$r_t = \sqrt{r_1^2 + \frac{d}{\pi} Vt} \tag{2}$$

Similarly, the decrease in the side area (cross-hatched part 13) of the tape 14 on the reel 12 due to the tape travel may be represented by the following equation:

$$\pi r_2^2 - \pi r_s^2 = dVt \tag{3}$$

from this, $r_s$ may be obtained by the following equation:

$$r_s = \sqrt{r_2^2 - \frac{d}{\pi} Vt} \tag{4}$$

The rotational frequency (r.p.s.) of the reel 10 is represented by N, at a spontaneous travel speed TS. At the time of cue signal reproduction, the travel speed TS generally corresponds to the high speed travel condition of the reel drive using a reel motor 6. That is, the spontaneous travel speed TS at the time t may be represented by the following equation:

$$TS = 2\pi r_t N \text{ (cm/s)} \tag{5}$$

When equation (2) is substituted into equation (5), the following equation is obtained:

$$TS = 2\pi \sqrt{r_1^2 + \frac{d}{\pi} Vt} \, N \tag{6}$$

The rotational period TR of the reel 12 at the travel speed TS may be represented as follows:

$$TR = \frac{2\pi r_s}{TS} \text{ (sec)} \tag{7}$$

When the equations (4) and (6) are substituted into equation (7), the following equation is obtained:

$$TR = \frac{\sqrt{r_2^2 - \frac{d}{\pi} Vt}}{\sqrt{r_1^2 + \frac{d}{\pi} Vt} \, N} \tag{8}$$

The frequency (pulse number) of the cue signal recorded at the travel speed V is represented by F (c/s) and the frequency (pulse number) of the detected cue signal reproduced at the travel speed TS is represented by f (c/s). This parameter f is proportional to a variation rate of the tape speed (TS/V) and the above parameter F. Thus, the next equation is established:

$$f = \frac{TS}{V} F \qquad (9)$$

When equation (6) is substituted into equation (9), the following equation is obtained:

$$f = \frac{2\pi \sqrt{r_1^2 + \frac{d}{\pi} Vt\, N}}{V} F \qquad (10)$$

As shown in FIG. 1, to the reel 12 is coupled a pulse generator 16 for generating a signal S1 (corresponding to a reel signal TP), P pulses in number (P=8 here) per revolution of the reel 12. The pulse generator 16 comprises a disk $16_1$ with 8 equidistantly spaced slits and a photo-interrupter $16_2$ whose optical path is conducted by these slits. The pulse generator 16 may comprise other means such as a combination of a rotary magnet ring and a lead switch.

When the pulse generator 16 as mentioned above is used, the period TP of each pulse of the signal S1 may be obtained as follows:

$$TP = \frac{TR}{P} \; (sec) \qquad (11)$$

When equation (8) is substituted into equation (11), the following equation is obtained:

$$TP = \frac{\sqrt{r_2^2 - \frac{d}{\pi} Vt}}{\sqrt{r_1^2 + \frac{d}{\pi} Vt\, NP}} \qquad (12)$$

A count value PC obtained by counting the detected cue signal (pulse number is f per second), taking this period TP as a gate period, may be obtained as follows:

$$PC = f \times TP \qquad (13)$$

When equations (10) and (12) are substituted into equation (13), the following equation is obtained:

$$PC = \frac{2\pi \sqrt{r_1^2 + \frac{d}{\pi} Vt\, N}}{V} F \times \frac{\sqrt{r_2^2 - \frac{d}{\pi} Vt}}{\sqrt{r_1^2 + \frac{d}{\pi} Vt\, NP}}$$

$$= \frac{2\pi \sqrt{r_2^2 - \frac{d}{\pi} Vt}}{VP} F \qquad (14)$$

It is to be noted that the parameter N related to the tape travel speed is not included in the equation (14). It is also important to note that all except the parameter t are constants (known data). That is, as may be apparent from equations (13) and (14), the data (PC) representing the predetermined position where the cue signal is recorded may be obtained, regardless of the tape travel speed during the reproduction of the cue signal, from the detected cue signal (of frequency f) corresponding to the recorded cue signal (of frequency F) and the reel signal (of period TP) corresponding to the rotation of the reel 12. The cue signals corresponding to frequencies f and F will hereinafter be called cue signal f and cue signal F for brevity.

Utilizing this principle, a plurality of mutually different cue signals may be easily discriminated. This will now be further described taking a microcassette tape recorder as an example.

For recording the proceedings of a conference, assume that Fa=32 (pulse/sec) is used as a first cue signal for discriminating a speech by person A, and Fb=78 (pulse/sec) is used as a second cue signal for discriminating a speech by person B. In a microcassette tape recorder, the next values are applied for each parameter of equation (14):

$r_2 = 1.34$ (cm)  $d = 0.00095$ (cm)
$V = 2.38$ (cm/sec)  $P = 8$ (pulse/revolution)
$t = 0-1,800$ (sec) (corresponding to one-way travel of a 30-minute tape)

When the above parameters and Fa=32 are substituted into equation (14), the following results are obtained:

$$\left. \begin{array}{ll} \text{When } t = 0, & PC_0 \approx 14 \text{ (pulses)} \\ \text{When } t = 1,800, & PC_{1,800} \approx 7 \text{ (pulses)} \end{array} \right\} \qquad (15)$$

When Fb=78 is substituted into equation (14), the following results are obtained:

$$\left. \begin{array}{ll} \text{When } t = 0, & PC_0 \approx 34 \text{ (pulses)} \\ \text{When } t = 1,800, & PC_{1,800} \approx 17 \text{ (pulses)} \end{array} \right\} \qquad (16)$$

The following facts may be deduced from equations (15) and (16). When the count value PC is between 7 and 14, the detected cue signal represents the first cue signal Fa. When the count value PC is between 17–34, the detected cue signal represents the second cue signal Fb. Accordingly, discrimination between Fa and Fb is possible even when considering a count error of ±1.

Referring to FIG. 1, a cue signal source $18_1$ generates the first cue signal Fa, and a cue signal source $18_2$ generates the second cue signal Fb. Either of these cue signals Fa and Fb (or another cue signal Fx which is not shown in the figure) is selected by a cue signal selecting switch 20. The cue signal selected by the switch 20 is input to a recording amplifier 22. On a cue signal F output from the recording amplifier 22 is superposed with a biasing current supplied from a bias oscillator 24. This cue signal F is supplied through a recording/playback switch 26 to a recording/playback head 28. The tape 14 is driven at a predetermined travel speed by the capstan 2 and the pinch roller 4 while the cue signal is being recorded. Thus, the cue signal F is recorded at the predetermined travel speed on the tape 14.

The tape 14 is driven by the rotation of the reel 10 during the searching operation for the cue signal. The cue signal on the tape 14 driven at high speed (spontaneous travel speed) by the reel 10 is detected by the head 28. The detected cue signal f detected by the head 28 is input through a playback amplifier 30 to a gate circuit 32.

The high speed rotation of the reel 12 is detected by the pulse generator 16. The optical path of the photo-interrupter $16_2$ is allowed to continue or is interrupted by the pivotal movement of the slotted disk $16_1$ coupled to the reel 12. The disk $16_1$ has 8 slits on its circumference that are spaced equidistantly from each other. A photo-transistor inside the photo-interrupter $16_2$ generates the signal S1 every time it senses light which passes one of these slits. The signal S1 is input to a flip-flop 34. The flip-flop 34 is triggered every time the signal S1 is generated. Thus, the output level of the flip-flop 34 is inverted 8 times for each revolution of the reel 12 or the disk $16_1$. The output of the flip-flop 34 whose level is inverted according to the rotation of the reel 12 is used as the reel signal TP previously described.

The reel signal TP is supplied as a gate signal to the gate circuit 32 as it is also input to a counter 36 as a count control signal. The gate circuit 32 opens when the logic level of the reel signal TP is "1" so as to pass the detected cue signal f. The counter 36 starts the counting operation when the reel signal TP rises from the logic level "0" to the logic level "1". The counter 36 continues to count the number of detected cue signals until the reel signal TP falls from the logic level "1" to the logic level "0". The result obtained during an interval while the logic level of the reel signal TP is "1" is output from the counter 36 and represents the predetermined position on the tape 14. When the count value PC is completely output, the counter 36 is cleared by a clearing pulse g. The pulse g has a width sufficiently smaller than the period of the signal TP. The pulse g is obtained by delaying the leading edge of the signal (logic "1" → logic "0") for a predetermined period of time by a delay circuit 38, and differentiating the delayed signal TP by a differentiation circuit 40.

For example, when the above-mentioned values are used, the position of the recording medium where Fa=32 (pulse/sec) is recorded is detected when PC takes any value in the range of $7 \pm 1$ through $14 \pm 1$. When the data PC is input to a logic circuit which provides the logic level "1" at the time when the condition $6 < PC < 15$ is satisfied, the predetermined position of the recording medium where the first cue signal Fa is recorded may be detected by the logic level "1" of the logic circuit. When the rotation of the reel 10, for example, is interrupted by the logic level "1", the travel of the tape 14 may be interrupted at the above-mentioned predetermined position.

Figure 2:
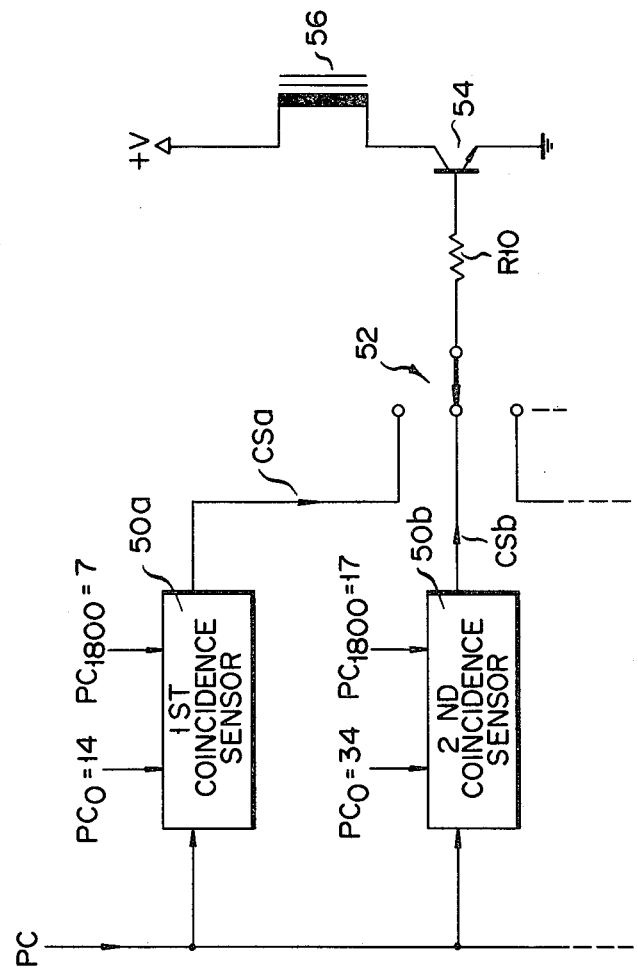
FIG. 2 is a diagram of an electrical circuit for discriminating the data PC obtained from the construction shown in FIG. 1.

FIG. 2 is a diagram of a logic circuit for obtaining the above-mentioned predetermined position. The data PC is input to coincidence sensors 50a, 50b, . . . . The sensor 50a is preset for data $PC_0=14$ and $PC_{1,800}=7$. The sensor 50b is preset for data $PC_0=34$ and $PC_{1,800}=17$. The sensor 50a outputs a first coincidence signal CSa to provide the logic level "1" when the data PC satisfies the condition $6<PC<15$. The sensor 50b outputs a second coincidence signal CSb to provide the logic level "1" when the data PC satisfies the condition $16<PC<35$. In summary, each of the coincidence sensors 50a, 50b, . . . outputs respective coincidence signals CSa, CSb, . . . when the condition $(PC_{1,800}-1)<PC<(PC_0+1)$ or $PC_{1,800} \leq PC \leq PC_0$ is satisfied.

Respective coincidence signals CSa, CSb, . . . are supplied to a selection switch 52 corresponding to the switch 20. The coincidence signal selected by the switch 52, for example, the signal CSb, is supplied through a resistor R10 to the base of an npn transistor 54. The emitter of the transistor 54 is grounded, and its collector is connected through a plunger solenoid 56 to a power source $+V$. The transistor 54 is turned on when the detected cue signal f (FIG. 1) is reproduced satisfying the condition $16<PC<35$ or $17 \leq PC \leq 34$. Then the solenoid 56 is rendered conductive and is activated. By this operation of the solenoid 56, the tape transporting operation of the tape transporting mechanism (2-12 in FIG. 1) is, for example, interrupted. The position where the tape travel is thus interrupted corresponds to the position where the second cue signal Fb is recorded. The tape travel is interrupted when the switch 52 is switched to the side of the sensor 50a and when signal f corresponding to the condition $6<PC<15$ or $7 \leq PC \leq 14$ is reproduced. The position where the tape travel is interrupted corresponds to the position where the first cue signal Fa is recorded.

FIG. 3 is a diagram illustrating an example of the construction of the coincidence sensors 50 (50a, 50b, . . .). The data PC is input to a first comparator $50_1$ and a second comparator $50_2$. The comparator $50_1$ is preset by the data $PC_0$, and the comparator $50_2$ is preset by the data $PC_{1,800}$. The comparator $50_1$ outputs a first comparing signal h to provide the logic level "0" when $PC>PC_0$ and the logic level "1" when $PC \leq PC_0$. The comparator $50_2$ outputs a second comparing signal i to provide the logic level "0" when $PC_{1,800}>PC$ and the logic "1" when $PC_{1,800} \leq PC$. The signals h and i are input to an AND gate $50_3$. The output signal j of the gate $50_3$ is input to a monostable multivibrator (MMV) $50_4$. The MMV $50_4$ is triggered when the signal j changes from the logic level "0" to the logic level "1". For a predetermined period of time after the MMV $50_4$ is triggered, it outputs the coincidence signal CS of logic level "1". The MMV $50_4$ may be considered to be a kind of timer circuit.

The MMV $50_4$ is triggered when the signal j changes to the logic level "1". The signal j changes to logic level "1" when both the signals h and i are at logic level "1", i.e. when $PC_{1,800} \leq PC \leq PC_0$ or $(PC_{1,800}-1)<PC<(PC_0+1)$. Thus, the signal CS is at logic level "0" when $PC>PC_0$ or $PC_{1,800}>PC$, and it is at logic level "1" when $PC_{1,800} \leq PC \leq PC_0$. The period wherein the signal CS is at logic level "1" is based on the time constant of the MMV $50_4$, so that the solenoid 56 of FIG. 2 may be able to operate.

Although specific constructions have been illustrated and described herein, it is not intended that the present invention be limited to the elements and constructions disclosed. Thus, various modifications may be made without departing from the scope and spirit of the present invention. For example, the pulse generator 16 may be coupled to the reel 10. Further, the tape 14 may be driven by the reel 12 (for the reviewing operation).

What is claimed is:

1. Apparatus for detecting a specific recording position on a recording medium comprising:

first means for providing a plurality of cue signals containing mutually different frequency components;

second means coupled to said first means for recording one of said cue signals at a specific recording position on the recording medium;

third means coupled to said second means including a reel on which is wound said recording medium, and means for rotating said reel to cause said recording medium to travel by the rotation of said reel, thereby driving said recording medium;

fourth means coupled to said third means for providing a reel signal corresponding to the rotation of said reel;

fifth means coupled to said third means for reproducing a detected cue signal corresponding to said recorded one of said cue signal from said recording medium when said recording medium is driven by the rotation of said reel; and sixth means coupled to said fourth and fifth means for counting the frequency components of said detected cue signal, taking said reel signal as a reference, and for generating data which represents said specific position as a function of said counted frequency components.

2. The apparatus of claim 1, further comprising:

a plurality of seventh means connected to said sixth means and each having preset data for providing a coincidence signal when said specific position data corresponds to said preset data; and eighth means connected to said seventh means for selecting one of said coincidence signals.

3. The apparatus of claim 2, further comprising:

ninth means connected to said eighth means for interrupting the travel of said recording medium in response to said coincidence signal selected by said eight means.

4. The apparatus of claim 3, wherein said seventh means includes:

a first comparator for comparing said specific position data with a first comparing datum and providing a first comparing signal when said specific data is smaller than said first comparing datum;

a second comparator for comparing said specific position data with a second comparing datum and providing a second comparing signal when said specific position data is greater than said second comparing datum; and an AND circuit for providing an output signal which is the logical AND product of said first comparing signal and said second comparing signal.

5. The apparatus of claim 4, wherein said seventh means further includes:

a timer circuit which is triggered by said output signal provided by said AND circuit and which provides said coincidence signal for a predetermined period of time so that the interruption of said travel by said ninth means is completed.

6. The apparatus of claim 2, wherein said seventh means includes:

a first comparator for comparing said specific position data with a first comparing datum and providing a first comparing signal when said specific data is smaller than said first comparing datum;

a second comparator for comparing said specific position data with a second comparing datum and providing a second comparing signal when said specific position data is greater than said second comparing datum; and an AND circuit for providing an output signal which is the logical AND product of said first comparing signal and said second comparing signal.

7. A method for detecting a specific recording position on a recording medium, the recording medium being wound on a reel, the method comprising:

reproducing a detected cue signal at a spontaneous travel speed of the recording medium, said detected cue signal having a frequency corresponding to the frequency of a given cue signal which was recorded at a predetermined recording travel speed of the recording medium at a specific position of the recording medium wound on a reel; and determining said specific position by counting the frequency of said detected cue signal, taking as a reference a repetitive reel signal having a period which is a function of the rotational frequency of said reel.

8. The method of claim 7, further comprising:

driving said recording medium at said spontaneous travel speed by rotating said reel around which said recording medium is wound; and wherein said step of determining said specific position comprises counting the frequency of said detected cue signal during a gate period corresponding to said period of said reel signal.

* * * * *